(12) United States Patent
Fujiwara (10) Patent No.: US 10,915,102 B2
(45) Date of Patent: Feb. 9, 2021

(54) VEHICLE

(71) Applicant: Panasonic Intellectual Property Management Co., Ltd., Osaka (JP)

(72) Inventor: Yoji Fujiwara, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 263 days.

(21) Appl. No.: 16/033,743

(22) Filed: Jul. 12, 2018

(65) Prior Publication Data

US 2019/0025829 A1 Jan. 24, 2019

(30) Foreign Application Priority Data

Jul. 20, 2017 (JP) .................. 2017-141047
May 21, 2018 (JP) .................. 2018-097076

(51) Int. Cl.
*G05D 1/00* (2006.01)
*G06F 3/16* (2006.01)
(Continued)

(52) U.S. Cl.
CPC .......... *G05D 1/0088* (2013.01); *B60K 35/00* (2013.01); *B60W 10/04* (2013.01); *B60W 10/18* (2013.01); *B60W 10/20* (2013.01); *B60W 50/00* (2013.01); *G06F 3/147* (2013.01); *G06F 3/1423* (2013.01); *G06F 3/16* (2013.01); *G06F 3/167* (2013.01); *B60K 2370/182* (2019.05); *B60K 2370/186* (2019.05); *B60Q 9/00* (2013.01); *B60W 2420/42* (2013.01); *B60W 2420/52* (2013.01);
(Continued)

(58) Field of Classification Search
CPC ..... G05D 1/0088; G06F 3/1423; G06F 3/147; G06F 3/16; G06F 3/167; B60K 35/00; B60W 10/04; B60W 10/18; B60W 10/20; B60W 50/00
See application file for complete search history.

(56) References Cited

U.S. PATENT DOCUMENTS 4,804,254 A * 2/1989 Doll .................... G02F 1/13392
349/155
2004/0246607 A1* 12/2004 Watson .................... B60R 1/12
359/872
(Continued)

FOREIGN PATENT DOCUMENTS

JP 2014-133512 7/2014
JP 2015-217798 12/2015
(Continued)

*Primary Examiner* — Behrang Badii
*Assistant Examiner* — Daniel L Greene
(74) *Attorney, Agent, or Firm* — Greenblum & Bernstein, P.L.C.

(57) ABSTRACT

A vehicle includes a first display circuit and a second display circuit. The first display circuit is disposed at a position capable of being visually checked by a driver. The second display circuit is disposed at a position capable of being visually checked by a driver. The first display circuit can display at least information about autonomous driving. The second display circuit can display at least information other than the information about the autonomous driving. First display circuit has first redundancy. The second display circuit has second redundancy lower than the first redundancy.

20 Claims, 8 Drawing Sheets

(51) Int. Cl.
  *B60W 10/04*      (2006.01)
  *B60W 10/18*      (2012.01)
  *B60W 10/20*      (2006.01)
  *B60K 35/00*      (2006.01)
  *G06F 3/14*       (2006.01)
  *B60W 50/00*      (2006.01)
  *G06F 3/147*      (2006.01)
  *B60Q 9/00*       (2006.01)
  *G05D 1/02*       (2020.01)

(52) U.S. Cl.
  CPC ..... *B60W 2554/00* (2020.02); *B60W 2556/00* (2020.02); *B60W 2710/18* (2013.01); *B60W 2710/20* (2013.01); *G05D 1/0246* (2013.01); *G05D 1/0257* (2013.01); *G05D 1/0278* (2013.01); *G06F 2211/1097* (2013.01); *G09G 2380/10* (2013.01)

(56) References Cited

U.S. PATENT DOCUMENTS

| | | | | |
|---|---|---|---|---|
| 2006/0284839 | A1* | 12/2006 | Breed | B62D 1/046 |
| | | | | 345/156 |
| 2008/0122799 | A1* | 5/2008 | Pryor | G06F 3/04847 |
| | | | | 345/173 |
| 2013/0145482 | A1* | 6/2013 | Ricci | B60W 40/08 |
| | | | | 726/28 |
| 2015/0211878 | A1* | 7/2015 | Jiyama | G01C 21/3632 |
| | | | | 701/439 |
| 2016/0077730 | A1* | 3/2016 | Shim | G06F 3/04883 |
| | | | | 715/773 |
| 2016/0193923 | A1* | 7/2016 | Kim | B60K 37/06 |
| | | | | 296/70 |
| 2016/0214621 | A1* | 7/2016 | Baalu | B60K 37/02 |
| 2017/0151979 | A1  | 6/2017 | Maeda et al. | |
| 2017/0225689 | A1* | 8/2017 | Mukai | B60W 10/18 |
| 2017/0253181 | A1* | 9/2017 | Choi | B60K 35/00 |
| 2017/0287233 | A1* | 10/2017 | Nix | G08G 1/166 |
| 2017/0344299 | A1* | 11/2017 | Ivanov | B60W 10/04 |
| 2018/0304749 | A1* | 10/2018 | Cho | B60K 35/00 |

FOREIGN PATENT DOCUMENTS

| | | |
|---|---|---|
| JP | 2017-205424 | 6/2017 |
| WO | 2017/068759 | 4/2017 |

* cited by examiner

VEHICLE

The present application claims the benefit of foreign priorities of Japanese patent application 2017-141047 filed on Jul. 20, 2017 and Japanese patent application 2018-097076 filed on May 21, 2018, the contents all of which are incorporated herein by reference.

BACKGROUND

1. Technical Field

The present disclosure relates to a vehicle that performs automated driving.

2. Description of the Related Art

In recent year, development of an automated driving vehicle is accelerated. In 2016, the National Highway Traffic Safety Administration (NHTSA) released definition of an automated driving level of Society of Automotive Engineers (SAE). According to the automated driving level, the automated driving level is classified into non-automated driving (level 0), driver assistance (level 1), partial automated driving (level 2), conditional automated driving (level 3), advanced automated driving (level 4), and completely automated driving (level 5).

At level 0, a human driver performs entire driving. At level 1, an automated driving system of a vehicle sometimes assists the human driver, carrying out some driving tasks. At level 2, the automated driving system of the vehicle can practically do some driving tasks, but the human driver must supervise a driving environment and continue to do the rest of the driving tasks. At level 3, the automated driving system actually does some driving tasks, and supervises a driving environment in a certain case. When the automated driving system makes a request, the human driver has to prepare to regain control. At level 4, the automated driving system can do the driving tasks and supervise a driving environment. A human being does not have to regain control, but the automated driving system can operate only in a certain environment or under a certain condition. At level 5, the automated driving system can do all driving tasks under all conditions that a human driver can drive.

At levels 4 and 5, a human being does not have to get involved in driving. Level 4 is for automated driving in a dedicated space or a limited area, and level 5 is for automated driving in an unlimited area. As of 2017, level 1 has been widely put to practical use, and level 2 has been partially put to practical use. At level 3, the automated driving system leads driving, and is required to be driven by a human being as need arises.

At levels 1 to 3, an interface between the automated driving system and the driver is required in a vehicle. Main notification from the automated driving system to the driver is to present a motion of a vehicle determined by the automated driving system to the driver. The driver can prepare for a next motion of the vehicle based on the presented motion. Level 3 requires notification such that switching from the automated driving system to the driver, and switching from driving led by the automated driving system to driving led by the driver is requested.

As of 2017, many vehicles are mounted with infotainment devices such as a car navigation device and display audio device. The infotainment device has a display and a speaker. Further, a vehicle mounted with a plurality of infotainment devices in a vehicle interior has been developed (for example, see International Publication No. 2017/068759). Therefore, as a device that makes a notification from the automated driving system to the driver, the infotainment device is considered to be utilized.

SUMMARY

The present disclosure provides a technique that realizes an interface that makes a notification from an automated driving system to a vehicle occupant at a low cost in accordance with a functional safety standard.

A vehicle from one aspect of the present disclosure includes a seat, a powertrain unit, a steering unit, a braking unit, a first display circuit, a second display circuit, a first control circuit, and a second control circuit. A driver can sit on the seat. The powertrain unit can be electrically controlled. The steering unit can be electrically controlled. The braking unit can be electrically controlled. The first display circuit is disposed at a position capable of being visually recognized by the driver. The second display circuit is disposed at a position capable of being visually recognized by the driver. The first control circuit is connected to the first display circuit. The second control circuit is connected to the second display circuit. The vehicle is configured to perform autonomous driving by electrically controlling the powertrain unit, the steering unit, and braking unit. The first display circuit can display at least information about autonomous driving. The second display circuit can display at least information other than the information about the autonomous driving. The first control circuit is operated on a first operating system. The second control circuit is operated on a second operating system larger in scale than the first operating system. The first display circuit has first redundancy. The second display circuit has second redundancy lower than the first redundancy.

Any combinations of the above-described components and modifications of the features of the present disclosure in methods, devices, systems, and computer programs are still effective as other aspects of the present disclosure.

According to the present disclosure, the interface that makes a notification from the automated driving system to the vehicle occupant can be realized at a low cost in accordance with the functional safety standard.

DETAILED DESCRIPTION

Prior to describing an exemplary embodiment of the present disclosure, issues concerning conventional techniques will be discussed briefly. A vehicle has to be manufactured in accordance with a functional safety standard mainly based on a standard of International Organization for Standardization (ISO) 26262. The standard of ISO 26262 is an international standard relating to a functional safety of electricity/electron of a 3.5 or less-ton passenger vehicle. In Automotive Safety Integrity Level (ASIL) defined by the standard of ISO 26262, ASIL D which is the highest level is required for Advanced Driving Assistant System (ADAS). At ASIL D, Single Point Fault Metric (SPFM) has to be 99% or more, and Latent Fault Metric (LFM) has to be 90% or more.

Since a device that makes a notification from an automated driving system to a vehicle occupant such as a driver is a device configuring the ADAS, ASIL defined by the standard of ISO26262 is required. As of 2017, most of infotainment devices such as a car navigation device do not conform to the ASIL defined by the standard of ISO 26262. Therefore, an existing infotainment device mounted on a vehicle cannot be basically used as a device that makes a notification from the automated driving system to the vehicle occupant. Further, in order to bring an infotainment device to be manufactured into compliance with the ASIL defined by the standard of ISO 26262, a cost has to be greatly increased.

Figure 1:
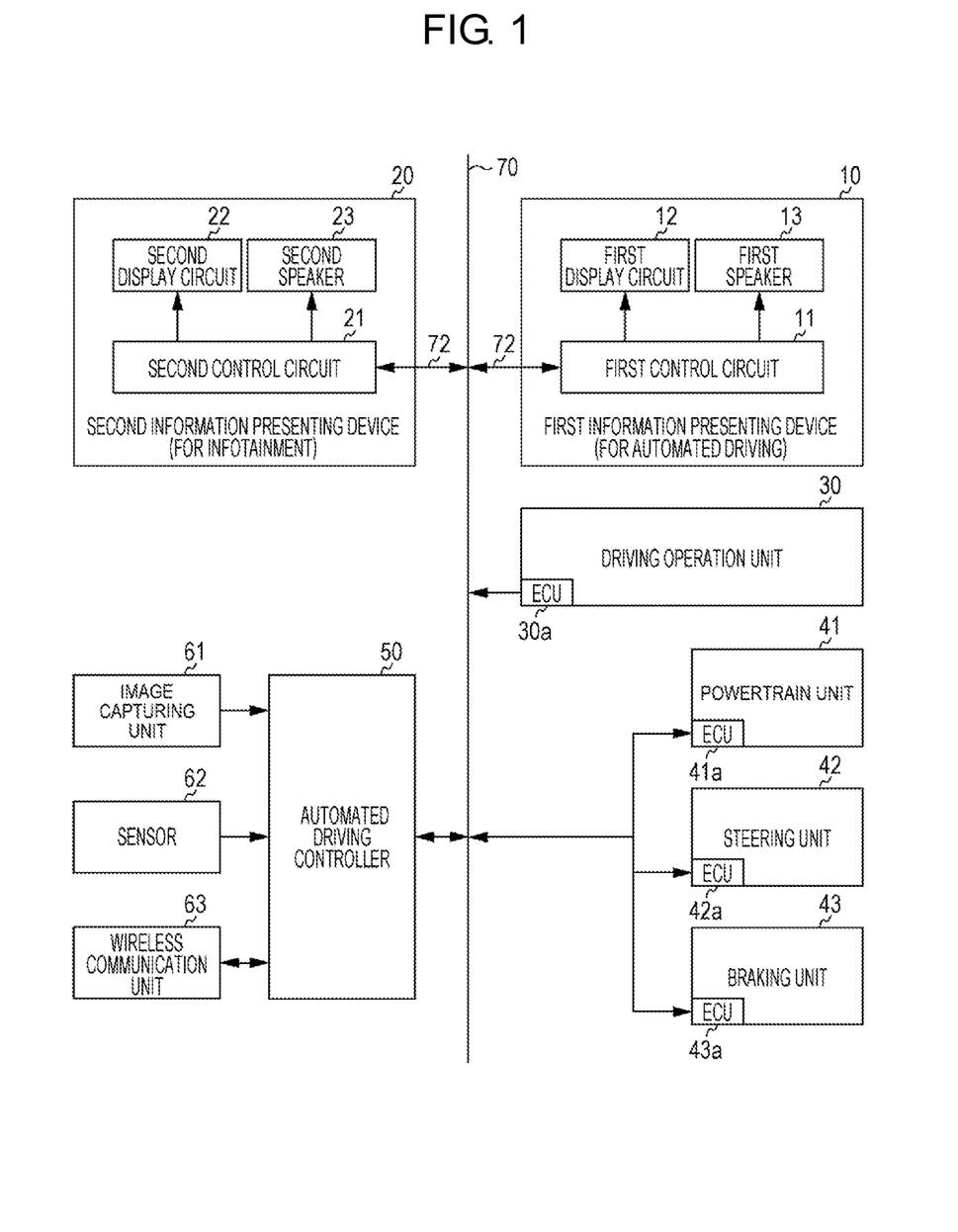
FIG. 1 is a block diagram illustrating a configuration of a vehicle according to an exemplary embodiment of the present disclosure.

FIG. 1 is a block diagram illustrating a configuration of vehicle 1 according to the exemplary embodiment of the present disclosure. Vehicle 1 according to the exemplary embodiment is a vehicle at the automated driving level 1 or above. The vehicle at level 3 is assumed in the following description. Vehicle 1 includes powertrain unit 41, steering unit 42, braking unit 43, driving operation unit 30, automated driving controller 50, image capturing unit 61, sensor unit 62, radio communication unit 63, first information presenting device 10, second information presenting device 20, in-vehicle network 70 having a gateway function.

Powertrain unit 41 is a general name of a member that accelerates vehicle 1, and includes an engine or a traveling motor, a transmission, and a power system electronic control unit (ECU) 41a. Steering unit 42 is a general name of a member that causes vehicle 1 to take a curve, and includes a power steering, and steering system ECU 42a. Braking unit 43 is a general name of a member that decelerates or stops vehicle 1, and includes a brake (for example, a hydraulic brake, a regeneration brake, or a regenerative cooperative brake), an antilock brake system (ABS), and braking system ECU 43a.

Power system ECU 41a, steering system ECU 42a, and braking system ECU 43a are connected to in-vehicle network 70. In-vehicle network 70 is structured by using at least one of standards such as a controller area network (CAN), a local interconnect network (LIN), a FlexRay (registered trade mark), and an Ethernet (registered trade mark). Power system ECU 41a, steering system ECU 42a, and braking system ECU 43a are connected to a main network of in-vehicle network 70. An example that the CAN is used for the main network is assumed in the present exemplary embodiment.

Driving operation unit 30 is a general name of a member that is used by a driver to operate vehicle 1. Driving operation unit 30 includes a gas pedal, a steering wheel, a brake pedal, a blinker switch, and operation ECU 30a. Operation ECU 30a converts an operation on the gas pedal by the driver into an electrically control signal, and transmits the control signal to power system ECU 41a, steering system ECU 42a, or braking system ECU 43a via in-vehicle network 70. Power system ECU 41a, steering system ECU 42a, or braking system ECU 43a controls a corresponding actuator based on the received control signal.

Image capturing unit 61 is a general name of at least one camera disposed in vehicle 1. For example, as image capturing unit 61, four visible light cameras are disposed on four places on front, rear, right, and left parts of vehicle 1, respectively. The four visible light cameras capture video images of the front, rear, right and left of vehicle 1, respectively. Image capturing unit 61 outputs an image signal generated by photoelectric conversion to automated driving controller 50.

Sensor unit 62 is a general name of various sensors (excluding image capturing unit 61) that obtains a status of the vehicle itself and a situation around the vehicle itself. For example, as sensor unit 62, a light detection and ranging (LIDAR) sensor, a millimeter-wave radar, a vehicle speed sensor, and a global positioning system (GPS).

The LIDAR emits a light beam (for example, an infrared ray) to a vicinity of vehicle 1 and receives its reflection signal to measure a distance with respect to a subject present in the vicinity, a size of the subject, and a composition of the subject based on the received reflection signal. The millimeter-wave radar emits a radio wave (a millimeter wave) to the vicinity of vehicle 1, and receives its reflection signal to measure a distance with respect to a subject present in the vicinity based on the received reflection signal. The millimeter-wave radar can detect also a remote object that is difficult to detect by the LIDAR. The vehicle speed sensor detects a speed of vehicle 1. The GPS sensor detects position information about vehicle 1. Specifically, the GPS sensor receives respective transmission times from a plurality of GPS satellites, and calculates latitude and longitude of a reception point based on the received transmission times.

Radio communication unit 63 wirelessly communicates with an external data center, a road-side device, and another vehicle. For example, a mobile telephone network (a cellular network), a wireless local area network (LAN), an electronic toll collection system (ETC), a dedicated short range communications (DSRC), a Vehicle-to-Infrastructure (V2I), and a Vehicle-to-Vehicle (V2V) can be used.

Automated driving controller 50 holds data such as a three-dimensional map necessary for autonomous driving, and causes vehicle 1 to perform autonomous driving based on a predetermined automated driving algorithm Specifically, automated driving controller 50 recognizes a state of the vehicle itself and a situation around the vehicle itself based on image data generated by image capturing unit 61, various detection data detected by sensor unit 62, and various information collected from an outside via radio communication unit 63.

Automated driving controller 50 applies the various parameters representing the recognized state of the vehicle itself and the situation around the vehicle to the automated driving algorithm to determine a motion of vehicle 1. Automated driving controller 50 generates a control command based on the determined motion, and transmits the control command to power system ECU 41a, steering system ECU 42a, or braking system ECU 43a via in-vehicle network 70. Power system ECU 41a, steering system ECU 42a, or braking system ECU 43a controls a corresponding actuator based on the received control command.

The automated driving algorithm is generated by, for example, artificial intelligence (AI) based on deep learning. Various parameters of the automated driving algorithm are initially set to values learned by a high-spec computer in advance, and the values updated from a data center on a cloud are suitably downloaded.

Second information presenting device 20 is an information presenting device for infotainment, and includes second control circuit 21, second display circuit 22, and a second speaker 23. Second control circuit 21 is connected to in-vehicle network 70 via signal harness 72. Second information presenting device 20 corresponds to, for example, a car navigation device or a display audio device.

First information presenting device 10 is an information presenting device for automated driving, and includes first control circuit 11, first display circuit 12, and first speaker 13. First control circuit 11 is connected to in-vehicle network 70 via signal harness 72.

A connection form of in-vehicle network 70 illustrated in FIG. 1 is one example, and thus various connection forms can be used. For example, in FIG. 1, second control circuit 21 of second information presenting device 20 is connected to image capturing unit 61, sensor unit 62, and radio communication unit 63 via automated driving controller 50 and a main network. However, second control circuit 21 may be connected directly to image capturing unit 61, sensor unit 62, and radio communication unit 63.

Further, in FIG. 1, first control circuit 11 of first information presenting device 10 is connected to automated driving controller 50 via the main network. However, second control circuit 21 may be connected directly to automated driving controller 50 via a dedicated signal harness.

Automated driving controller 50, operation ECU 30a, power system ECU 41a, steering system ECU 42a, braking system ECU 43a, and in-vehicle network 70 are in accordance with the ASIL defined by the standard of ISO 26262. Not illustrated, but a dashboard including a speed meter and a tachometer are also in accordance with the ASIL defined by the standard of ISO 26262.

Second information presenting device 20 for infotainment does not have to conform to the ASIL defined by the standard of ISO 26262. Most of infotainment devices actually do not conform to the ASIL defined by the standard of ISO 26262.

On the other hand, first information presenting device 10 for automated driving has to conform to the ASIL defined by the standard of ISO 26262. In principle, automated driving controller 50 does not cause second display circuit 22 of second information presenting device 20 to display information about autonomous driving. Further, automated driving controller 50 does not cause second speaker 23 of second information presenting device 20 to make a notification. Automated driving controller 50 causes first display circuit 12 of first information presenting device 10 to display the information about autonomous driving. Alternatively, automated driving controller 50 causes first speaker 13 of first information presenting device 10 to make a notification. Alternatively automated driving controller 50 performs both of these operations.

The information about autonomous driving includes a motion of vehicle 1 determined by automated driving controller 50. Automated driving controller 50 basically causes first display circuit 12 to display a current motion of vehicle 1 (for example, acceleration, deceleration, right curve, or left curve). Alternatively, automated driving controller 50 causes first speaker 13 to make a notification. Alternatively automated driving controller 50 performs both of these operations. Further, automated driving controller 50 causes first display circuit 12 to display a next motion of vehicle 1 determined based on the automated driving algorithm a predetermined time before a scheduled time at which this motion is made. Alternatively, automated driving controller 50 causes first speaker 13 to make a notification. Alternatively automated driving controller 50 performs both of these operations.

In vehicle 1 at the automated driving level 3, automated driving controller 50 occasionally determines that autonomous driving is difficult. For example, on a road on which a lane is not drawn, it is difficult to specify a lane, and thus the autonomous driving is occasionally difficult. Further, in a case of dense fog or heavy rainfall, it is difficult to clearly capture an image of a front of vehicle 1, and thus the autonomous driving is occasionally difficult. When determining that the autonomous driving is difficult, automated driving controller 50 causes first display circuit 12 to display a message for requesting the switching from driving led by automated driving controller 50 to driving led by the driver. Alternatively, automated driving controller 50 causes first speaker 13 to make a notification. Alternatively automated driving controller 50 performs both of these operations.

Figure 2:
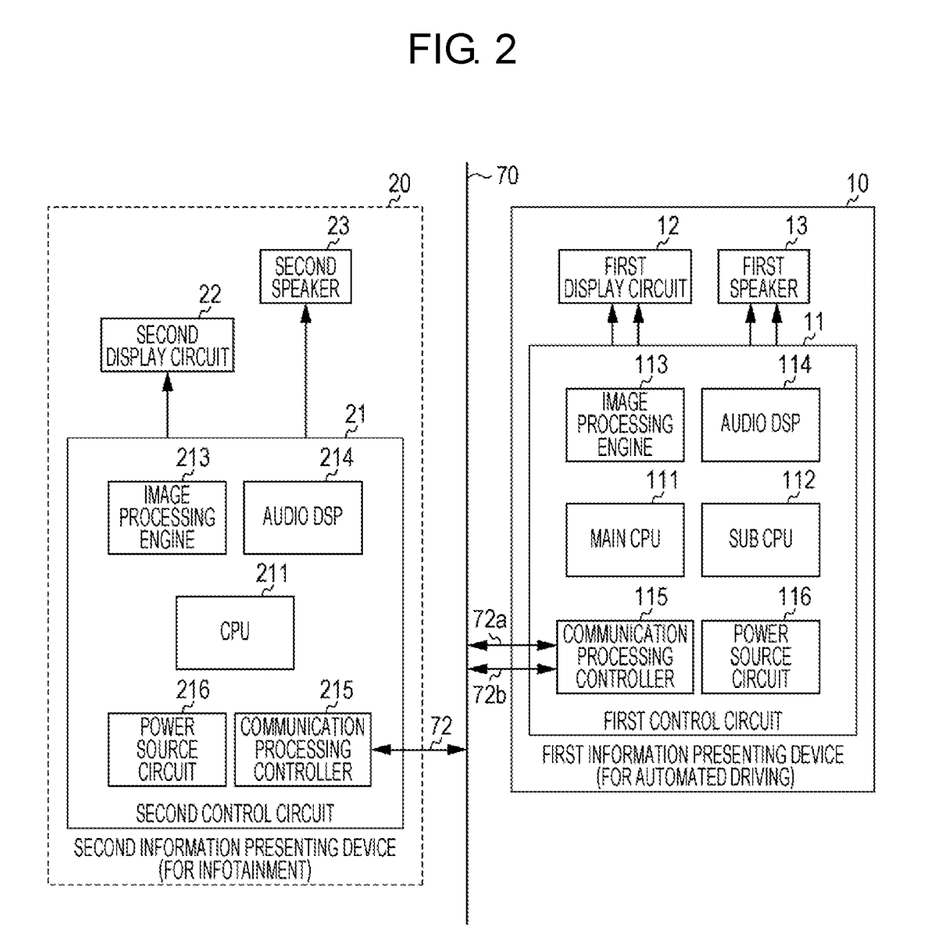
FIG. 2 is a diagram illustrating a first configuration example of a first information presenting device and a second information presenting device in FIG. 1.

FIG. 2 is a diagram illustrating a first configuration example of first information presenting device 10 and second information presenting device 20 in FIG. 1. Second control circuit 21 of second information presenting device 20 includes central processing unit (CPU) 211, image processing engine 213, audio digital signal processor (DSP) 214, communication processing controller 215, and power source circuit 216. Second control circuit 21 is configured by, for example, a system large-scale integration (LSI), and a system on a chip (SoC).

CPU 211 operates on a high-level operating system (HLOS), and generally controls entire second control circuit 21.

Image processing engine 213 is a general name of an engine that executes specific image processes such as codec, a moving image process, and a 3D graphic process. A signal that has been subject to the image process by image processing engine 213 is output to second display circuit 22. Audio digital signal processor (DSP) 214 executes a predetermined sound process. The signal that has been subject to the sound process by audio DSP 114 is output to second speaker 23.

Communication processing controller 215 executes a communication process for a signal to be transmitted/received via signal harness 72. For example, in a case of a CAN controller, communication processing controller 215 transmits/receives a message defined by a CAN protocol. Communication processing controller 215 operates on a real-time operating system (RTOS).

Power source circuit 216 steps down a power supply voltage supplied from a power supply unit including a secondary battery (in general, 12 V) to generate a power supply voltage to be supplied to the LSI in second control circuit 21 (in general, 3 V to 5 V). As power source circuit 216, for example, a switching regulator can be used.

Second display circuit 22 includes a liquid crystal panel or an organic electro-luminescence (EL) panel, and causes the liquid crystal panel or the organic EL panel to display an image based on an image signal to be supplied from image processing engine 213. Second speaker 23 for infotainment is mostly disposed on a plurality of places in vehicle 1 in order to provide high quality. For example, in some cases, second speaker 23 is disposed on totally four places on right and left parts of the front side and right and left parts of the rear side in vehicle 1. In second information presenting device 20 for infotainment, second control circuit 21 and second speaker 23 are physically separated from each other in most occasions, and in such separation type second control circuit 21 and second speaker 23 are connected to each other by a harness.

In a case where second control circuit 21 contains a digital to analog converter (DAC) and an amplifier, a drive signal for driving a diaphragm of second speaker 23 is supplied from second control circuit 21 to second speaker 23. When the DAC and the amplifier are externally installed and disposed on second speaker 23, an audio signal is output from second control circuit 21 to the DAC.

First control circuit 11 of first information presenting device 10 includes main CPU 111, sub CPU 112, image processing engine 113, audio DSP 114, communication processing controller 115, and power source circuit 116. First control circuit 11 is also configured by, for example, a system LSI and a SoC similarly to second control circuit 21.

Main CPU 111 and sub CPU 112 operate on the RTOS, and generally control entire first control circuit 11. In a normal state, main CPU 111 operates, and sub CPU 112 stands by. When abnormality occurs in main CPU 111, main CPU 111 stops, and sub CPU 112 operates. Image processing engine 113, audio DSP 114, communication processing controller 115, and power source circuit 116 are basically equal in configuration to second control circuit 21.

First control circuit 11, first display circuit 12, and first speaker 13 of first information presenting device 10 are packaged integrally into one case. Therefore, a wire between first control circuit 11 and first display circuit 12, and a wire between first control circuit 11 and first speaker 13 become short. The wire between first control circuit 11 and first speaker 13 has a length shorter than a length of a wire between second control circuit 21 and second speaker 23.

Since first information presenting device 10 conforms to the ASIL defined by the standard of ISO26262, various redundancies are achieved. In an example illustrated in FIG. 2, two CPUs including main CPU 111 and sub CPU 112 are disposed. Further, main CPU 111 and sub CPU 112 operates not on a versatile HLOS but on the RTOS. The RTOS is an OS such that a time resource is emphasized and provision of a real-time property for the processes is primarily intended. The RTOS has a scheduling function of a task according to priority, a real-time task control function that does not depend on presence/absence of an interruption, and a predicting function for a kernel processing time. OSs that do not have at least one of these functions are classified into a non-RTOS. In the RTOS, functions are narrowed down, and thus a probability of crash is lower than in the HLOS.

Main CPU 111 and sub CPU 112 of first information presenting device 10 operate on the RTOS. On the other hand, as described above, CPU 211 of second information presenting device 20 operates on the HLOS. The HLOS is a non-RTOS and is larger in scale than the RTOS. The HLOS is generally large-scale open source software (OSS), and is widely employed as a platform of software. As an in-vehicle large-scale open source OS, Android (registered trade mark), Automotive Grade Linux (AGL) (registered trade mark)) and the like are used.

The OS of an infotainment device needs to be mounted with a large-scale application, and thus is generally developed in a large-scale and versatile open source OS. The large-scale and versatile open source OS does not conform to the functional safety standard.

When an OS of the ADAS device is developed in the large-scale and versatile open source OS, since the OS does not conform to the functional safety standard, a great number of verification steps are required for verifying the safety. Further, a software component that copes with a hazard needs to be added. Originally, use of the versatile open source OS can decrease a number of developing steps and a cost. However, in a case where an OS is developed in conformity to the ASIL defined by the standard of ISO 26262 required by the ADAS device, the use of the versatile open source OS greatly increases the number of developing steps and the cost.

On the contrary, an RTOS for incorporation that conforms to the functional safety standard is present. As the RTOS for incorporation that conforms to the ASIL defined by the standard of ISO 26262, INTEGRITY, AUTOSAR, TRON (registered trade mark) Safe Kernel, or QNX (registered trade mark) OS for Safety can be used.

A lot of suppliers are present in a supply chain of vehicle manufacturing. A certain supplier procures components (including parts and software components) from a subordinate supplier, and supplies higher components into which the procured components are incorporated to a higher supplier.

In order to realize the functional safety in collaboration among a lot of suppliers, a concept of Safety Element out of Context (SEooC) is defined in the standard of ISO 26262. A component supplier cannot frequently recognize the functional safety concept of an entire system, and thus development of components is required with awareness of the functional safety concept of the entire system. Therefore, the supplier prepares a safety manual that defines assumptions for contexts to be used by the components, and provides the safety manual to other suppliers or manufacturers of completed products.

The safety manual includes description about (1) a functional safety mechanism of components, (2) assumption of safety requirement satisfied by the components, (3) a configuration of the components, integration with other components, and essentials for usage, (4) a module test that has to be conducted after the integration, and (5) already-known problems such that the module might have an effect on the functional safety.

The safety manual defines how to integrate matters outside the context into the context and realize the functional safety. Higher suppliers or manufacturers of the completed product that use the components have to manufacture higher components or completed vehicles, based on restrictions described in the safety manual. Further, artifacts described in the safety manual (for example, a file group relating to designs and tests used for a component development and) can be utilized by the higher suppliers or higher manufacturers of the completed product when safety authentication is conducted by a third party.

The above-described INTEGRITY, AUTOSAR, TRON (registered trade mark) Safe Kernel, and QNX (registered trade mark) OS for Safety conform to a safety manual of other components according to the standard of ISO 26262. Further, these RTOSs have safety manuals of self components. On the contrary, Android (registered trade mark) and Automotive Grade Linux (registered trade mark (AGL)) do not conform to safety manuals of other components according to the standard of ISO 26262, and do not have safety manuals of self components.

In the present exemplary embodiment, first information presenting device 10 as the ADAS device and second information presenting device 20 as the infotainment device are separated from each other. In first information presenting device 10, the RTOS that conforms to the standard of ISO 26262 is used. In second information presenting device 20, the versatile HLOS is used. As a result, an efficient development is realized.

On the contrary, when first information presenting device 10 as the ADAS device and second information presenting device 20 as the infotainment device are operated in a single control circuit, it is necessary that an OS that requires safety authentication and an OS that requires an advanced process coping with rich contents coexist. In this case, a developer takes the safety authentication based on the SEooC, and a great number of developing steps are required for ensuring no bad effect of the coexisting other systems. On the contrary, both of them are separated from each other so that an efficient development can be achieved.

Figure 3A:
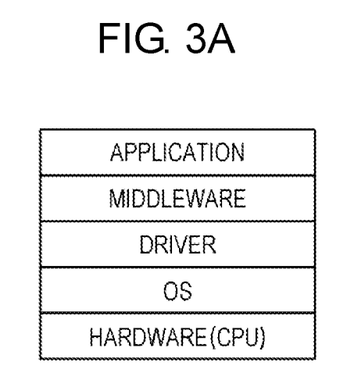
FIG. 3A is a conceptual diagram schematically illustrating an architecture when a high-level operating system (HLOS) is used.
Figure 3B:
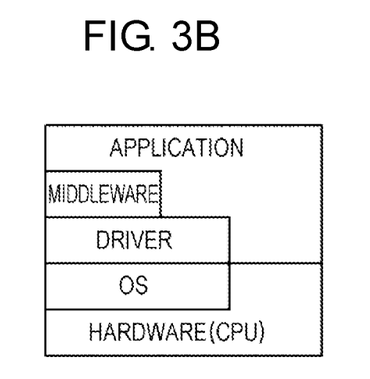
FIG. 3B is a conceptual diagram schematically illustrating an architecture when a real-time operating system (RTOS) for incorporation is used.

FIG. 3A and FIG. 3B are conceptual diagrams schematically illustrating architectures when the HLOS is used and the RTOS for incorporation is used. In the architecture when the HLOS illustrated in FIG. 3A is used, entire hardware is basically under control of the OS, and a driver for using the hardware (for example, a base driver, a class driver, or a filter driver) is provided. Further, middleware is prepared and a plurality of applications (including a user interface) operates on the middleware. Herein, the hardware of the HLOS illustrated in FIG. 3A corresponds to CPU 211 in second control circuit 21.

On the other hand, in the architecture where the RTOS for incorporation illustrated in FIG. 3B is used, the OS supervises only essential hardware, and the function of the hardware is kept to a minimum. The driver is disposed only for hardware being under the supervision of the OS. The middleware is option and thus can be omitted. The RTOS for incorporation can control hardware directly from an application. When the middleware is omitted or the hardware is controlled directly from the application, a number of hierarchies is smaller than in the HLOS. Herein, the hardware of the RTOS for incorporation illustrated in FIG. 3B corresponds to main CPU 111 and sub CPU 112 in first control circuit 11.

The description returns to FIG. 2. First control circuit 11 and in-vehicle network 70 are connected to each other by at least dual signal harness 72 (in FIG. 2, first signal harness 72a and second signal harness 72b). First control circuit 11 and first display circuit 12 are connected to each other by at least a dual wire. When a selector is disposed in first display circuit 12 and abnormality is detected in the wire in use, the selector selects another wire. First control circuit 11 and first speaker 13 are similarly connected to each other by a dual wire.

As described above, first control circuit 11 and first speaker 13 are connected to each other by the dual wire, and second control circuit 21 and second speaker 23 are connected by the single wire. However, a number of systems between first control circuit 11 and first speaker 13, and a number of systems between second control circuit 21 and second speaker 23 are not limited to 2 and 1, respectively. That is, the number of systems between first control circuit 11 and first speaker 13 may be set to be larger than the number of systems between second control circuit 21 and second speaker 23. In such a relationship, as to a connection system to the speakers, redundancy of first speaker 13 can be regarded as being higher than redundancy of second speaker 23.

As described above, as to the connection system, the redundancy of first speaker 13 is higher than the redundancy of second speaker 23. For this reason, even if a wire of one system of first speaker 13 is disconnected, first speaker 13 can continue to operate using wires of the remaining systems. That is, as to the connection systems, a situation that the redundancy of first speaker 13 is higher than the redundancy of second speaker 23 means that, as to a failure of the connection systems, resistance of first speaker 13 is higher than resistance of second speaker 23.

Figure 4:
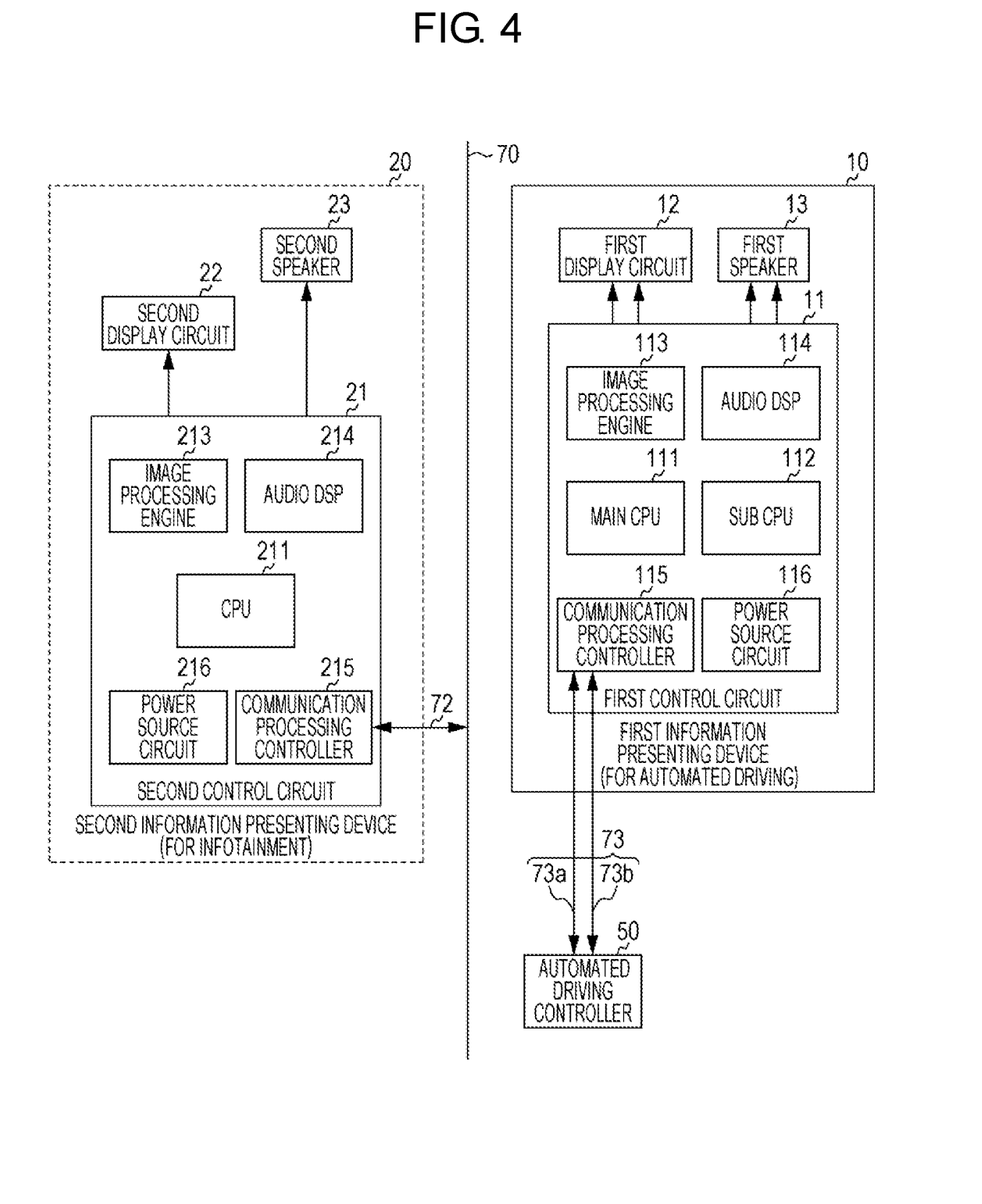
FIG. 4 is a diagram illustrating a second configuration example of the first information presenting device and the second information presenting device in FIG. 1.

FIG. 4 is a diagram illustrating a second configuration example of first information presenting device 10 and second information presenting device 20 illustrated in FIG. 1. In the second configuration example, first control circuit 11 and automated driving controller 50 are connected directly to each other by dedicated signal harness 73. Also in this case, first control circuit 11 and automated driving controller 50 are connected by at least dual signal harness 73 (in FIG. 4, first signal harness 73a and second signal harness 73b).

Figure 5:
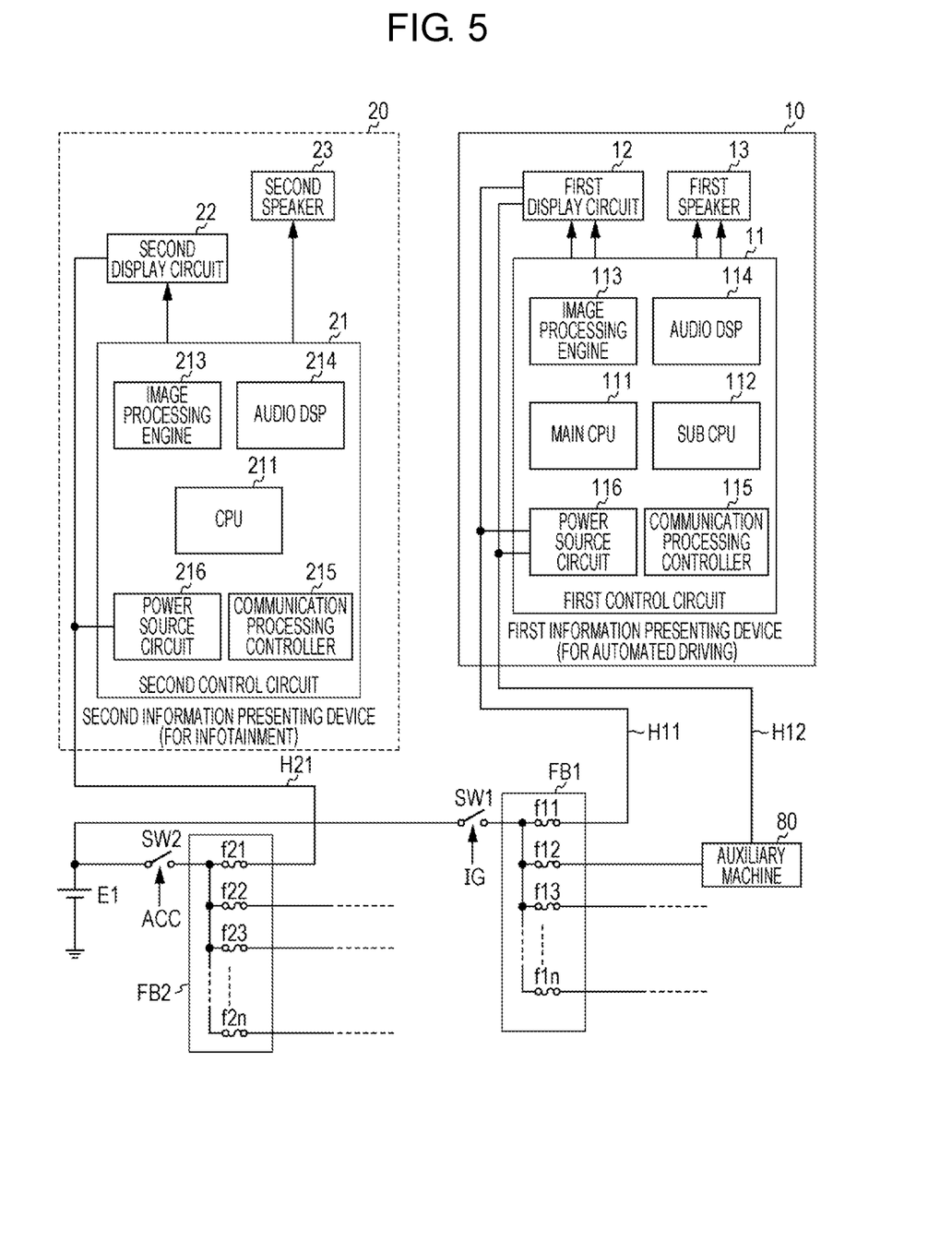
FIG. 5 is a diagram for describing power supply routes of the first information presenting device and the second information presenting device in FIG. 1.

FIG. 5 is a diagram for describing a power supply route of first information presenting device 10 and second information presenting device 20 in FIG. 1. In FIG. 5, for simplification the signal harnesses are omitted. Vehicle 1 includes first power supply unit E1 including a first secondary battery, first fuse box FB1, and second fuse box FB2. First power supply unit E1 is a main power supply that supplies power to an auxiliary machine and an accessory device in vehicle 1. First power supply unit E1 normally includes a lead battery with output of 12 V as the first secondary battery.

First power supply unit E1 and second fuse box FB2 are connected to each other via second switch SW2. Second fuse box FB2 branches a single power supply route from first power supply unit E1 into a plurality of power supply routes. The accessory devices are connected to leading ends of plurality of branched power supply routes via first fuse f21 to nth fuse f2n, respectively. When an electric current of a predetermined value or more is applied to the wire forming the power supply route, the fuse is blown. Therefore, the accessory devices can be protected from an excessive current.

First power supply unit E1 is connected to first fuse box FB1 via first switch SW1. First fuse box FB1 branches a single power supply route from first power supply unit E1 into a plurality of power supply routes. Auxiliary machines are connected to leading ends of the plurality of branched power supply routes via first fuse f11 to nth fuse f1n, respectively. When an electric current of a predetermined value or more is applied to a wire forming the power supply route, the fuse is blown. Therefore, the auxiliary machines can be protected from an excessive current.

Second switch SW2 is a switch that interlocks with an on/off state of an accessory key (ACC), and first switch SW1 is a switch that interlocks an on/off state of an ignition key (IG). Second information presenting device 20 for infotainment is classified as the accessory device, and first information presenting device 10 for automated driving is classified as the auxiliary machine.

Second control circuit 21 of second information presenting device 20 is connected to second fuse box FB2 via power supply harness H21. That is, second control circuit 21 is connected to first power supply unit E1 via power supply harness H21 and first fuse f21 of second fuse box FB2.

First control circuit 11 of first information presenting device 10 is connected to first fuse box FB1 via first power supply harness H11. That is, first control circuit 11 is connected to first power supply unit E1 via first power supply harness H11 and first fuse f11 of first fuse box FB1.

First information presenting device 10 makes the power supply routes redundant. In the example illustrated in FIG. 5, first control circuit 11 of first information presenting device 10 is further connected to another auxiliary machine 80 via second power supply harness H12. Auxiliary machine 80 is connected to first power supply unit E1 via second fuse f12 of first fuse box FB1. Therefore, first control circuit 11 of first information presenting device 10 has a power supply route that connects with first power supply unit E1 via second power supply harness H12, auxiliary machine 80, and second fuse f12 of first fuse box FB1. First control circuit 11 may be connected to still another auxiliary machine via a power supply harness to have still another power supply route.

In the example illustrated in FIG. 5, second display circuit 22 is configured to be connected directly to second fuse box FB2 via power supply harness H21. However, second display circuit 22 may be configured to be connected to second fuse box FB2 via second control circuit 21. First display circuit 12 may be similarly configured to be connected to first fuse box FB1 via first control circuit 11.

Figure 6:
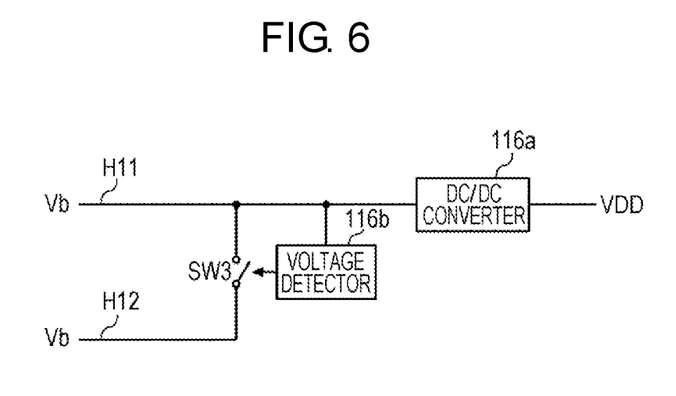
FIG. 6 is a diagram illustrating a configuration example of a power source circuit in FIG. 5.

FIG. 6 is a diagram illustrating a configuration example of power source circuit 116 illustrated in FIG. 5. Power source circuit 116 includes direct current to direct current (DC/DC) converter 116a, voltage detector 116b, and third switch SW3. DC/DC converter 116a is connected to first power supply harness H21, and reduces power supply voltage Vb supplied from first power supply unit E1 (in general, 12 V). DC/DC converter 116a generates power supply voltage VDD (in general, 3 V to 5 V) to be supplied to a large-scale integrated circuit (an LSI) included in first control circuit 11. As DC/DC converter 116a, for example, a switching regulator can be used.

Second power supply harness H12 merges with first power supply harness H11 via third switch SW3. Voltage detector 116b monitors an input voltage of DC/DC converter 116a, and when the input voltage is lower than a predetermined threshold, turns on third switch SW3. As a result, even when a voltage of first power supply harness H11 drops due to disconnection of a wire, DC/DC converter 116a is brought into conduction with second power supply harness H12. As a result, power feeding to DC/DC converter 116a can be secured.

Figure 7:
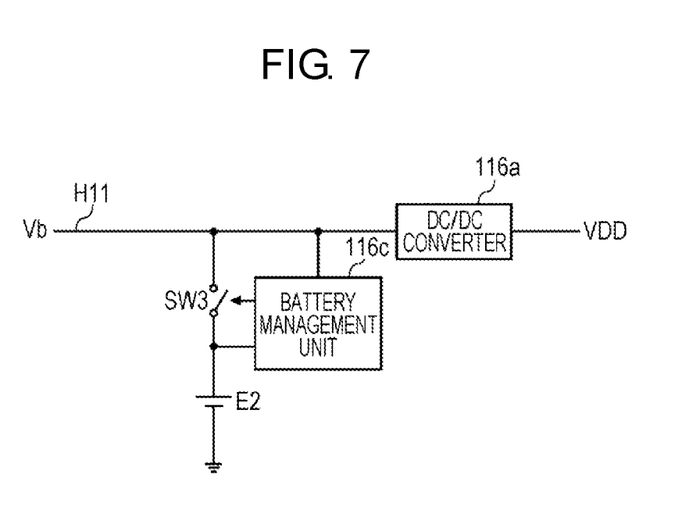
FIG. 7 is a diagram illustrating a modification of the power source circuit.

FIG. 7 is a diagram illustrating a modification of power source circuit 116. FIG. 5 and FIG. 6 illustrate an example that the power supply route between first power supply unit E1 and first information presenting device 10 is multiplied. However, instead of multiplication, first information presenting device 10 may be mounted with second power supply unit E2 including a second secondary battery. Second power supply unit E2 is a backup power supply, and as the second secondary battery, a lithium ion battery or a nickel metal hydride battery, for example, can be used.

Power source circuit 116 includes DC/DC converter 116a, second power supply unit E2, battery management unit 116c, and third switch SW3. DC/DC converter 116a is connected to first power supply harness H11, and decreases power supply voltage Vb (in general, 12 V) supplied from first power supply unit E1. DC/DC converter 116a generates power supply voltage VDD (in general, 3 V to 5 V) supplied to the LSI included in first control circuit 11.

A positive terminal of second power supply unit E2 is connected to first power supply harness H11 via third switch SW3. Battery management unit 116c supervises an input voltage of DC/DC converter 116a, and when the input voltage is less than a predetermined threshold, turns on third switch SW3. As a result, even when a voltage of first power supply harness H11 drops due to disconnection of a wire, DC/DC converter 116a is brought into conduction with second power supply unit E2. As a result, power can be fed from second power supply unit E2 to DC/DC converter 116a.

As described above, first power supply harness H11 and second power supply harness H12 are connected to power source circuit 116 of first control circuit 11. Power supply harness H21 is connected to power source circuit 216 of second control circuit 21. Herein, a number of power supply harnesses to be connected to power source circuit 116, and a number of power supply harnesses to be connected to power source circuit 216 are not limited to 2 and 1, respectively. That is, a number of power supply harnesses to be connected to power source circuit 116 is set to be larger than a number of power supply harnesses to be connected to power source circuit 216. In such a relationship, as to the power supply, it can be understood that redundancy of power source circuit 116 is higher than redundancy of power source circuit 216.

As to the power supply, the redundancy of power source circuit 116 is higher than the redundancy of power source circuit 216. As a result, if a defect is detected in the power supply, even when, for example, at least a part of first power supply harness H11 is disconnected, the power can be continued to be supplied to power source circuit 116 using second power supply harness H12. That is, the situation that as to the power supply, the redundancy of power source circuit 116 is higher than the redundancy of power source circuit 216 means that as to failure of the power supply, resistance of power source circuit 116 is higher than resistance of power source circuit 216.

Similarly, first power supply harness H11 and second power supply harness H12 are connected to first display circuit 12. Power supply harness H21 is connected to second display circuit 22. However, a number of power supply harnesses to be connected to first display circuit 12 and a number of power supply harnesses to be connected to second display circuit 22 are not limited to 2 and 1, respectively. That is, a number of power supply harnesses to be connected to first display circuit 12 may be set to be larger than a number of power supply harnesses to be connected to second display circuit 22. In such a relationship, it is understood that as to the power supply, the redundancy of first display circuit 12 is higher than the redundancy of second display circuit 22.

As described above, as to the power supply, the redundancy of first display circuit 12 is higher than the redundancy of second display circuit 22. As a result, if a defect is detected in the power supply, even when, for example, at least a part of first power supply harness H11 is disconnected, the power can be continued to be supplied to first display circuit 12 using second power supply harness H12. That is, a situation that as to the power supply, the redundancy of first display circuit 12 is higher than the redundancy of second display circuit 22 means that as to a failure of the power supply, the resistance of first display circuit 12 is higher than the resistance of second display circuit 22.

Further, battery management unit 116c supervises a voltage of second power supply unit E2, and when the voltage of second power supply unit E2 is less than a predetermined value, turns on third switch SW3 to charge second power supply unit E2. When the voltage of second power supply unit E2 reaches the predetermined value, third switch SW3 is turned off, and the charging of second power supply unit E2 is completed. The multiplication of the power supply route illustrated in FIG. 5 and FIG. 6 and the mounting of the backup power supply illustrated in FIG. 7 may be used in combination.

Figure 8A:
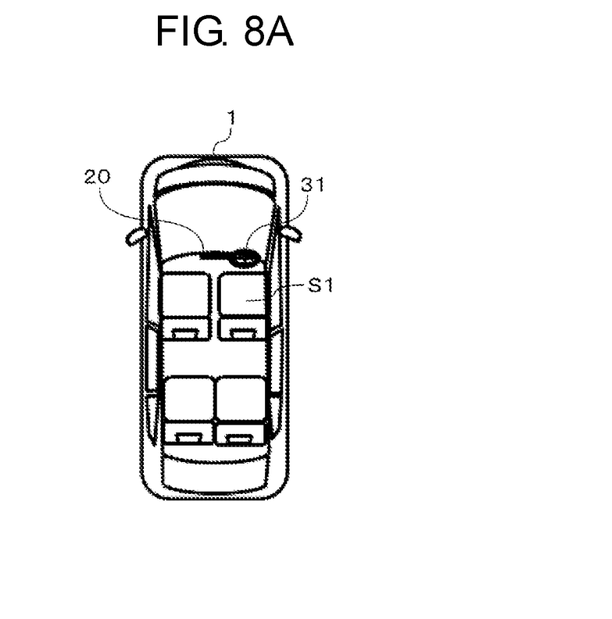
FIG. 8A is a diagram illustrating a layout example of the first information presenting device and the second information presenting device in the vehicle.
Figure 8B:
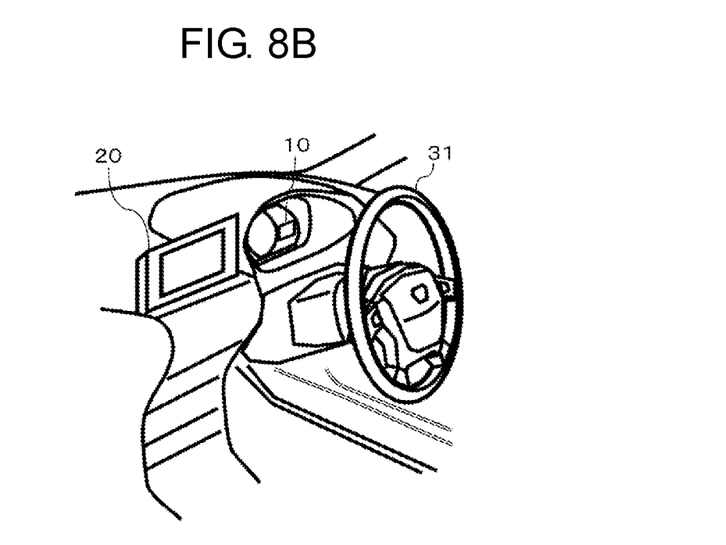
FIG. 8B is a diagram illustrating a layout example of the first information presenting device and the second information presenting device in the vehicle.

FIG. 8A and FIG. 8B are diagrams illustrating a layout example of first information presenting device 10 and second information presenting device 20 in vehicle 1. FIG. 8A is a pattern diagram illustrating vehicle 1 as viewed from above. FIG. 8B is a pattern diagram illustrating a vicinity of a driver seat in vehicle 1. Vehicle 1 illustrated in FIG. 8A and FIG. 8B is a four-seat vehicle in which steering wheel 31 is disposed on a right side. A driver sits on driver seat S1 on a right front and drives vehicle 1. When steering wheel 31 is disposed on a left side, the driver sits on a seat on a left front and drives vehicle 1.

Second information presenting device 20 is disposed on a center of the dashboard. First information presenting device 10 is disposed in or near the dashboard. The system of first information presenting device 10 is smaller in a scale than the system of second information presenting device 20, and first information presenting device 10 is designed to be smaller in at least one of a shape and a size than second information presenting device 20. Particularly, first display circuit 12 is designed smaller in at least one of the shape and size than second display circuit 22.

The dashboard is disposed so as to oppose driver seat S1. Therefore, first information presenting device 10 is disposed so as to be closer to driver seat S1 than second information presenting device 20 is. The driver can visually check first display circuit 12 of first information presenting device 10 with a slight visual shift from a normal visual position in which the driver looks ahead. That is, the driver can visual check first display circuit 12 with a visual shift that is equivalent to a visual shift when the driver views the speed meter or the tachometer. At this point, the visual shift is larger when the driver views second display circuit 22 of second information presenting device 20 than when views first display circuit 12.

Figure 9:
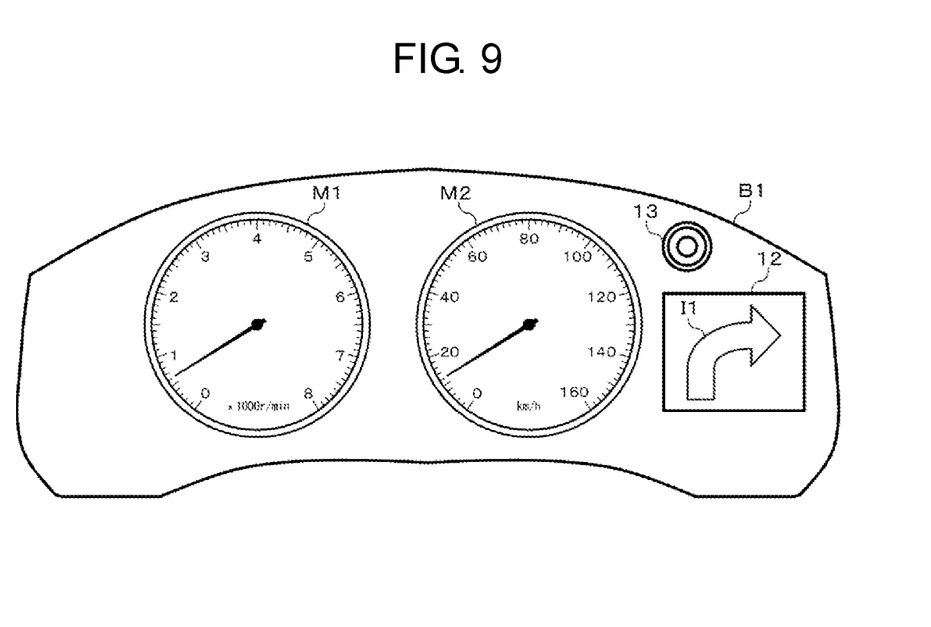
FIG. 9 is a diagram illustrating a first configuration example of a dashboard.

FIG. 9 is a diagram illustrating a first configuration example of dashboard B1. Dashboard B1 includes tachometer M1 and speed meter M2. In FIG. 9, in order to simplify the drawing, other meters are omitted. First information presenting device 10 is disposed on a rear side of dashboard B1. First display circuit 12 and first speaker 13 are exposed on the surface. In FIG. 9, first display circuit 12 is disposed on a right side of tachometer M1 and speed meter M2, but may be disposed on a left side. Further, first display circuit 12 may be disposed between tachometer M1 and speed meter M2.

For example, pictographic image I1 representing a motion of vehicle 1 is displayed on first display circuit 12. In the example illustrated in FIG. 9, pictographic image I1 indicating a right curve is displayed. For example, a sound message representing a motion of vehicle 1 is notified form first speaker 13. For example, a sound message such as "turn right" is output.

Figure 10:
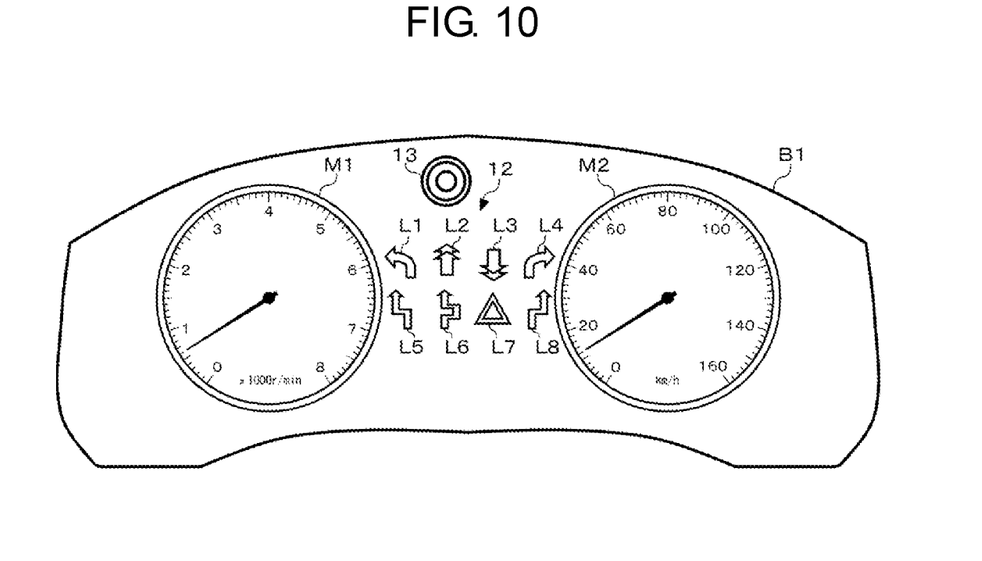
FIG. 10 is a diagram illustrating a second configuration example of the dashboard.

FIG. 10 is a diagram illustrating a second configuration example of dashboard B1. In the second configuration example, first display circuit 12 is configured by a plurality of telltale lamps L1 to L8. In the second configuration example, a liquid crystal panel or an organic electroluminescence (EL) panel is not necessary, and light emitting diodes (LEDs) are used so that a number of the LEDs conforms to a number of telltale lamps L1 to L8. The plurality of telltale lamps L1 to L8 is disposed between tachometer M1 and speed meter M2.

In the example illustrated in FIG. 10, first lamp L1 indicates a left curve, second lamp L2 indicates acceleration, third lamp L3 indicates deceleration, fourth lamp L4 indicates right curve, fifth lamp L5 indicates left lane changing, sixth lamp L6 indicates overtaking, seventh lamp L7 indicates emergency stop, and eighth lamp L8 indicates right lane changing. These lamps are telltale lamps. In FIG. 10, in order to simplify the drawing, an existing telltale lamp such as a seat belt, a door opener, and air-bags are omitted.

First control circuit 11 applies an electric current to a corresponding lamp indicating a motion based on motion information of vehicle 1 supplied from automated driving controller 50 to turn on the corresponding lamp. In the second configuration example, first control circuit 11 does not have to be mounted with image processing engine 113, and thus a robust display system can be structured at a low cost. Further, a control circuit of the existing telltale lamps can be integrated with a control circuit of a new telltale lamp relating to autonomous driving.

In the first configuration example, the example that the sound message is notified from first speaker 13 has been described. In the second configuration example, a beep sound according to a notification content may be notified from first speaker 13. In this case, first control circuit 11 does not have to be mounted with audio DSP 114, and a robust sound system can be structured at a low cost.

According to the present exemplary embodiment, as described above, an interface that notifies a vehicle occupant such as a driver of the message from automated driving controller 50 can be realized at a low cost in accordance with the functional safety standard. In the device for infotainment, since contents become rich, a system becomes large in scale. Therefore, it is difficult to cause the device for infotainment to conform to the functional safety standard. When the device for infotainment is caused to conform to the functional safety standard, a great increase in a cost must be accepted.

On the contrary, besides second information presenting device 20 for infotainment, first information presenting device 10 for automated driving in which a function is further narrowed down is additionally disposed. As a result, a device that makes a notification to a vehicle occupant and conforms to the functional safety standard can be structured at a low cost.

The present disclosure has been described above according to the exemplary embodiment. It will be understood by those skilled in the art that the exemplary embodiment is merely an example, other exemplary modifications in which components and processes of the exemplary embodiment are variously combined are possible, and the other exemplary modifications still fall within the scope of the present disclosure.

The above exemplary embodiment has described the configuration that first information presenting device 10 includes both first display circuit 12 and first speaker 13, but any one of them may be provided. Further, in the description of the examples illustrated in FIG. 9 and FIG. 10, first information presenting device 10 is disposed on dashboard B1, but may be disposed on any places other than dashboard B1 as long as the driver can easily view first information presenting device 10. For example, first information presenting device 10 may be disposed on a pad portion of the steering wheel. Further, first display circuit 12 may be configured by Head Up Display (HUD). Further, in the description of the example illustrated in FIG. 9, first display circuit 12 and first speaker 13 are disposed in dashboard B1. However, the present disclosure is not limited to this example, and first display circuit 12 and first speaker 13 may be disposed in any places other than dashboard B1. Further, in the description of the example illustrated in FIG. 10, first speaker 13, first lamp L1, second lamp L2, third lamp L3, fourth lamp L4, fifth lamp L5, sixth lamp L6, seventh lamp L7, and eighth lamp L8 are disposed in dashboard B1. However, the present disclosure is not limited to this example, these lamps may be disposed in any places other than dashboard B1.

The above exemplary embodiment has described the configuration example that first display circuit 12 and first speaker 13 of first information presenting device 10 are controlled only by control circuit 11. However, a control circuit that controls first display circuit 12 and a control circuit that controls first speaker 13 may be disposed separately. Similarly, the configuration example that second display circuit 22 and second speaker 23 of second information presenting device 20 are controlled only by control circuit 21 has been described. However, a control circuit that controls second display circuit 22 and a control circuit that controls second speaker 23 may be disposed separately.

Note that the exemplary embodiment may be specified by the following items.

[Item 1]

Vehicle (1) includes seat (S1), powertrain unit (41), steering unit (42), braking unit (43), first display circuit (12), second display circuit (22), first control circuit (11), and second control circuit (21). A driver can sit on seat (S1). Powertrain unit (41) can be electrically controlled. Steering unit (42) can be electrically controlled. Braking unit (43) can be electrically controlled. First display circuit (12) is disposed at a position capable of being visually checked by the driver. Second display circuit (22) is disposed at a position capable of being visually checked by the driver. First control circuit (11) is connected to first display circuit (12). Second control circuit (21) is connected to second display circuit (22). Vehicle (1) is configured to perform autonomous driving by electrically controlling powertrain unit (41), steering unit (42), and braking unit (43). First display circuit (12) can display at least information about autonomous driving. Second display circuit (22) can display at least information other than the information about the autonomous driving. First control circuit (11) operates on a first operating system. Second control circuit (21) operates on a second operating system larger in scale than the first operating system. First display circuit (12) has first redundancy. Second display circuit (22) has second redundancy lower than the first redundancy.

In Item 1, first display circuit (12) and second display circuit (22) are developed separately. As a result, an interface of the display system in vehicle (1) can be realized at a low cost while the functional safety is satisfied.

[Item 2]

In vehicle (1) described in Item 1, the first operating system is a real-time operating system, and the second operating system is a non-real-time operating system.

In item 2, first control circuit (11) is operated in the real-time operating system, so that probability that the operation of first control circuit (11) stops can be reduced.

[Item 3]

In vehicle (1) described in Item 1 or 2, the first operating system has a first number of hierarchies, and the second operating system has a second number of hierarchies larger than the first number of hierarchies.

In Item 3, a real-time performance of a process in first control circuit (11) can be improved.

[Item 4]

In vehicle (1) described in any one of Items 1 to 3, the first operating system conforms to the functional safety standard defined by International Organization for Standardization (ISO) 26262.

In Item 4, the functional safety of first control circuit (11) can be satisfied.

[Item 5]

In vehicle (1) described in Item 4, the second operating system does not conform to the functional safety standard defined by ISO 26262.

In Item 5, second control circuit (21) can be developed at a low cost.

[Item 6]

Vehicle (1) described in any one of Items 1 to 5 further includes power supply unit (E1) having a secondary battery. First display circuit (12) is connected to power supply unit (E1) by routes of a first number of systems. Second display circuit (22) is connected to power supply unit (E1) by one or more routes of a second number of systems smaller than the first number of systems. The first number of systems may be two. The second number of systems may be one.

In Item 6, redundancy of the power supply route of first display circuit (12) is achieved, and thus a probability that display of first display circuit (12) stops can be reduced.

[Item 7]

Vehicle (1) described in any one of Items 1 to 5 further includes first power supply unit (E1) having a first secondary battery, and second power supply unit (E2) having a second secondary battery. First display circuit (12) is connected to first power supply unit (E1) and second power supply unit (E2). Second display circuit (22) is connected to first power supply unit (E1) but not to second power supply unit (E2).

In Item 7, second power supply unit (E2) for backup is provided, and thus a probability that display of first display circuit (12) stops can be reduced.

[Item 8]

In vehicle (1) described in Item 7, a capacity of the first secondary battery is larger than a capacity of the second secondary battery.

In Item 8, a backup power supply of first display circuit (12) can be configured at a low cost.

[Item 9]

In vehicle (1) described in any one of Items 1 to 8, a video signal to first display circuit (12) is connected by routes of a third number of systems, and a video signal to second display circuit (22) is connected by one or more routes of a fourth number of systems smaller than the third number of systems. The third number of systems may be two. The fourth number of systems may be one.

In Item 9, a probability that the video signal to first display circuit (12) is interrupted can be reduced.

[Item 10]

In vehicle (1) described in any one of Items 1 to 9, the information about the autonomous driving is information about a motion of vehicle (1). The motion of vehicle (1) may include running, curving, and stopping.

In Item 10, first display circuit (12) in which functional safety is secured is enabled to display information representing a motion of vehicle (1).

[Item 11]

In vehicle (1) described in any one of Items 1 to 10, the information about the autonomous driving is information for advising a driver to switch into driving led by the driver. The "advise" is a concept including "highly "recommend" (namely, demand).

In Item 11, first display circuit (12) in which functional safety is secured is enabled to display the information for advising the driver to switch into driving led by the driver.

[Item 12]

In vehicle (1) described in any one of Items 1 to 11, second display circuit (22) can display at least a map.

In Item 12, second display circuit (22) is caused to display rich contents such as a map, so that second display circuit (22) unadaptable to the functional safety, and first display circuit (12) adaptable to the functional safety can be preferably used differently.

[Item 13]

In vehicle (1) described in Item 12, second display circuit (22) can display at least the map and the information about the autonomous driving.

In Item 13, the information about the autonomous driving can be displayed not only on first display circuit (12) but also on second display circuit (22). As a result, redundancy of the display of the information about the autonomous driving can be heightened.

[Item 14]

Vehicle (1) described in any one of Items 1 to 13 includes first speaker (13) and second speaker (23). First speaker (13) can notify the driver of the information about the autonomous driving. Second speaker (23) can notify a driver of information other than the information about the autonomous driving. First speaker (13) has third redundancy. Second speaker (23) has fourth redundancy lower than the third redundancy.

In Item 14, first speaker (13) and second speaker (23) are developed separately, and thus a sound interface in vehicle (1) can be realized at a low cost while the functional safety is satisfied.

[Item 15]

Vehicle (1) described in Item 14 further includes third control circuit (11) connected to first speaker (13), fourth control circuit (21) connected to second speaker (23), and power supply unit (E1) having a secondary battery. Third control circuit (11) is connected to power supply unit (E1) by at least two routes. Fourth control circuit (21) is connected to power supply unit (E1) by a single route.

In Item 15, redundancy of the power supply route of third control circuit (11) is achieved, and thus a probability that sound outputs of third control circuit (11) and first speaker (13) stop can be reduced.

[Item 16]

In vehicle (1) described in Item 14 or 15, an audio signal to first speaker (13) is connected by routes of a fourth number of systems, and a sound signal to second speaker (23) is connected by one or more routes of a fifth number of systems smaller than the fourth number of systems.

In Item 16, a probability that the audio signal to first speaker (13) stops can be reduced.

[Item 17]

In vehicle (1) described in any one of Items 1 to 16, first display circuit (12) is disposed closer to seat (S1) than second display circuit (22) is.

In Item 17, first display circuit (12) can be viewed more easily from the driver than second display circuit (11).

[Item 18]

Vehicle (1) described in any one of Items 1 to 17 further includes at least one meter (M1, M2) disposed so as to oppose seat (S1). First display circuit (12) is disposed so as to be adjacent to at least one meter (M1, M2). "Adjacent" may mean existing in a region separated from an end of one meter by a length of a diameter of the one meter in a plane.

In Item 18, first display circuit (12) is disposed near meter (M1, M2), and thus first display circuit (12) can be easily viewed by the driver.

[Item 19]

Vehicle (1) described in any one of Items 1 to 18 further includes at least two meters (M1, M2) disposed so as to oppose seat (S1). First display circuit (12) is disposed between two meters (M1, M2).

In Item 19, first display circuit (12) is disposed between two meters (M1, M2), and thus first display circuit (12) can be viewed easily by the driver.

[Item 20]

In vehicle (1) described in any one of Items 1 to 19, first display circuit (12) has a first shape, and second display circuit (22) has a second shape. The first shape is smaller than the second shape.

In Item 20, first display circuit (12) is made to be smaller than second display circuit (22), and thus a manufacturing cost of first display circuit (12) can be reduced.

The present disclosure relates to a vehicle, and is effective particularly as a vehicle that performs autonomous driving.

What is claimed is:
1. A vehicle comprising:
   a driver's seat on which a driver sits;
   a powertrain unit that is electrically controlled;
   a steering unit that is electrically controlled;
   a braking unit that is electrically controlled;
   a first information presenting device comprising:
      a first display circuit disposed at a position to be visually checked by the driver, and
      a first control circuit connected to the first display circuit;
   a second information presenting device different from the first information presenting device and comprising:
      a second display circuit disposed at a position to be visually checked by the driver, and
      a second control circuit connected to the second display circuit;
   wherein
   the vehicle is configured to perform autonomous driving by electrically controlling the powertrain unit, the steering unit, and the braking unit,
   the first information presenting device, the second information presenting device, the powertrain unit, the steering unit, and the braking unit are connected to an in-vehicle network mounted to the vehicle,
   the first display circuit displays at least information about the autonomous driving,
   the second display circuit displays at least information other than the information about the autonomous driving,
   the first control circuit operates on a first operating system,
   the second control circuit operates on a second operating system larger in scale than the first operating system,
   the first display circuit has first redundancy,
   the second display circuit has second redundancy lower than the first redundancy,
   the first information presenting device and the second information presenting device are fixed to the vehicle, and the first information presenting device is disposed closer to the driver's seat than the second information presenting device is.

2. The vehicle according to claim 1, wherein
the first operating system is a real-time operating system, and
the second operating system is a non-real-time operating system.

3. The vehicle according to claim 1, wherein
the first operating system has a first number of hierarchies, and
the second operating system has a second number of hierarchies larger than the first number of hierarchies.

4. The vehicle according to claim 1, further comprising a power supply unit having a secondary battery,
wherein
the first display circuit is connected to the power supply unit by routes of a first number of systems, and
the second display circuit is connected to the power supply unit by one or more routes of a second number of systems smaller than the first number of systems.

5. The vehicle according to claim 1, wherein
a video signal to the first display circuit is connected by routes of a third number of systems, and
a video signal to the second display circuit is connected by one or more routes of a fourth number of systems smaller than the third number of systems.

6. The vehicle according to claim 1, wherein the information about the autonomous driving is information about a motion of the vehicle.

7. The vehicle according to claim 1, wherein the information about the autonomous driving is information for advising the driver to switch into driving led by the driver.

8. The vehicle according to claim 1, further comprising at least one meter disposed so as to oppose the driver's seat,
wherein the first display circuit is disposed so as to be adjacent to the at least one meter.

9. The vehicle according to claim 1, further comprising at least two meters disposed so as to oppose the driver's seat,
wherein the first display circuit is disposed between the two meters.

10. The vehicle according to claim 1, wherein
the first display circuit has a first shape,
the second display circuit has a second shape, and
the first shape is smaller than the second shape.

11. The vehicle according to claim 1, wherein the first operating system conforms to a functional safety standard defined by International Organization for Standardization (ISO) 26262.

12. The vehicle according to claim 11, wherein the second operating system does not conform to the functional safety standard defined by ISO 26262.

13. The vehicle according to claim 1, further comprising:
a first power supply unit having a first secondary battery; and
a second power supply unit having a second secondary battery,
wherein
the first display circuit is connected to the first power supply unit and the second power supply unit, and
the second display circuit is connected to the first power supply unit and is not connected to the second power supply unit.

14. The vehicle according to claim 13, wherein a capacity of the first secondary battery is larger than a capacity of the second secondary battery.

15. The vehicle according to claim 1, wherein the second display circuit displays at least a map.

16. The vehicle according to claim 15, wherein the second display circuit displays at least the map and the information about the autonomous driving.

17. The vehicle according to claim 1, further comprising:
a first speaker; and
a second speaker,
wherein
the first speaker notifies the driver of the information about the autonomous driving,
the second speaker notifies the driver of the information other than the information about the autonomous driving,
the first speaker has third redundancy, and
the second speaker has fourth redundancy lower than the third redundancy.

18. The vehicle according to claim 17, further comprising:
a third control circuit that is connected to the first speaker;
a fourth control circuit that is connected to the second speaker; and
a power supply unit having a secondary battery,
wherein
the third control circuit is connected to the power supply unit by at least two routes, and
the fourth control circuit is connected to the power supply unit by a single route.

19. The vehicle according to claim 17, wherein
an audio signal to the first speaker is connected by routes of a fourth number of systems, and
an audio signal to the second speaker is connected by one or more routes of a fifth number of systems smaller than the fourth number of systems.

20. A vehicle system comprising:
a first information presenting device comprising:
a first display circuit disposed at a position to be visually checked by the driver, and
a first control circuit connected to the first display circuit; and
a second information presenting device different from the first information presenting device and comprising:
a second display circuit disposed at a position to be visually checked by the driver, and
a second control circuit connected to the second display circuit;
wherein
the first information presenting device and the second information presenting device are connected to an in-vehicle network mounted to the vehicle,
the first display circuit displays information about at least the autonomous driving,
the second display circuit displays information about at least information other than the information about the autonomous driving,
the first control circuit operates on a first operating system,
the second control circuit operates on a second operating system larger in scale than the first operating system,
the first information presenting device and the second information presenting device are fixed to a vehicle, and
the first information presenting device is disposed closer to a driver's seat than the second information presenting device is.

* * * * *